US009786268B1

(12) United States Patent
Ledet

(10) Patent No.: US 9,786,268 B1
(45) Date of Patent: Oct. 10, 2017

(54) MEDIA FILES IN VOICE-BASED SOCIAL MEDIA

(75) Inventor: David Gerard Ledet, Allen, TX (US)

(73) Assignee: Open Invention Network LLC, Durham, NC (US)

( * ) Notice: Subject to any disclaimer, the term of this patent is extended or adjusted under 35 U.S.C. 154(b) by 967 days.

(21) Appl. No.: 13/095,981

(22) Filed: Apr. 28, 2011

Related U.S. Application Data

(60) Provisional application No. 61/354,307, filed on Jun. 14, 2010.

(51) Int. Cl.

| | | |
|---|---|---|
| *G10L 15/26* | (2006.01) | |
| *G10L 15/00* | (2013.01) | |
| G10L 13/00 | (2006.01) | |
| G10L 21/00 | (2013.01) | |
| H04B 7/00 | (2006.01) | |
| H04M 1/00 | (2006.01) | |
| H04W 24/00 | (2009.01) | |
| G06Q 10/00 | (2012.01) | |
| G06Q 99/00 | (2006.01) | |
| H04M 5/00 | (2006.01) | |
| H04M 11/00 | (2006.01) | |
| G06F 7/00 | (2006.01) | |
| H04N 7/10 | (2006.01) | |
| G06F 13/00 | (2006.01) | |
| H04N 5/228 | (2006.01) | |
| H04N 7/14 | (2006.01) | |
| G06F 15/16 | (2006.01) | |
| G06F 3/048 | (2013.01) | |
| G06F 3/16 | (2006.01) | |

(52) U.S. Cl.
CPC .................................. *G10L 15/00* (2013.01)

(58) Field of Classification Search
USPC ... 704/9, 260, 235, 246, 275, 203, 206, 254, 704/243, 258; 455/518, 569.1, 456.1; 705/7.13, 319; 379/265.09, 88.14; 707/3, 101, 5; 348/222.1, 14.01; 709/205; 715/781, 727; 370/260; 725/53, 32
See application file for complete search history.

(56) References Cited

U.S. PATENT DOCUMENTS

| | | | |
|---|---|---|---|
| 6,426,956 B1 | 7/2002 | Eteminan | |
| 6,490,550 B1 | 12/2002 | Hiri | |
| 7,617,094 B2 * | 11/2009 | Aoki | H04M 3/564 370/260 |
| 7,899,500 B2 * | 3/2011 | Kreiner | H04M 1/271 455/557 |

(Continued)

OTHER PUBLICATIONS

Facebook, Party Line, http://www.facebook.com/apps/application.php?id=24334230464, Apr. 27, 2010.

(Continued)

*Primary Examiner* — Neeraj Sharma
(74) *Attorney, Agent, or Firm* — Haynes and Boone, LLP

(57) ABSTRACT

An apparatus, method and computer program for inserting information into a conversation between two or more devices is provided. In one embodiment, speech data is received at a device. The speech data is analyzed and converted into text utilizing one or more speech-to-text algorithms. The text is examined to locate information that may be related to the text on the data network.

20 Claims, 8 Drawing Sheets

(56) References Cited

U.S. PATENT DOCUMENTS

| | | | | |
|---|---|---|---|---|
| 8,223,189 | B2* | 7/2012 | Meyer | H04M 3/51 348/14.01 |
| 8,904,442 | B2* | 12/2014 | Begeja | G06F 17/30796 725/51 |
| 9,049,117 | B1* | 6/2015 | Nucci | H04L 63/302 |
| 2007/0005570 | A1* | 1/2007 | Hurst-Hiller et al. | 707/3 |
| 2008/0059189 | A1* | 3/2008 | Stephens | G10L 13/08 704/258 |
| 2008/0133235 | A1* | 6/2008 | Simoneau | G10L 15/197 704/243 |
| 2008/0201361 | A1 | 8/2008 | Castro et al. | |
| 2008/0256109 | A1 | 10/2008 | Irvin et al. | |
| 2009/0030682 | A1 | 1/2009 | VanSickle et al. | |
| 2009/0157714 | A1* | 6/2009 | Stanton | G06F 17/30613 |
| 2009/0191893 | A1* | 7/2009 | Smith | G06F 1/1632 455/456.1 |
| 2009/0204402 | A1* | 8/2009 | Marwaha et al. | 704/260 |
| 2009/0222258 | A1* | 9/2009 | Fukuda | G10L 25/93 704/203 |
| 2009/0249244 | A1* | 10/2009 | Robinson et al. | 715/781 |
| 2009/0254346 | A1* | 10/2009 | Moore | G10L 15/265 704/260 |
| 2009/0259472 | A1* | 10/2009 | Schroeter | 704/260 |
| 2009/0259970 | A1 | 10/2009 | Hawkins | |
| 2009/0271200 | A1* | 10/2009 | Mishra | G10L 15/30 704/254 |
| 2009/0326947 | A1* | 12/2009 | Arnold | G06Q 30/02 704/257 |
| 2009/0327263 | A1* | 12/2009 | Maghoul | G06F 17/30654 |
| 2010/0036666 | A1* | 2/2010 | Ampunan | G10L 15/187 704/251 |
| 2010/0119053 | A1* | 5/2010 | Goeldi | 379/265.09 |
| 2010/0131264 | A1* | 5/2010 | Ljolje | G06F 17/27 704/9 |
| 2010/0138224 | A1* | 6/2010 | Bedingfield, Sr. | G10L 15/22 704/275 |
| 2010/0158213 | A1* | 6/2010 | Mikan | H04M 3/42221 379/88.14 |
| 2010/0241963 | A1* | 9/2010 | Kulis | G06F 3/167 715/727 |
| 2010/0293105 | A1* | 11/2010 | Blinn et al. | 705/319 |
| 2011/0035220 | A1* | 2/2011 | Opaluch | 704/246 |
| 2011/0043652 | A1* | 2/2011 | King et al. | 348/222.1 |
| 2011/0195739 | A1* | 8/2011 | Deleus et al. | 455/518 |
| 2011/0219076 | A1* | 9/2011 | Roope et al. | 709/205 |
| 2011/0288897 | A1* | 11/2011 | Erhart et al. | 705/7.13 |
| 2012/0016678 | A1* | 1/2012 | Gruber | G06F 17/3087 704/275 |

OTHER PUBLICATIONS

Vivox, The Voice for Games, Voice Chat for GAmes and Virtual Worlds, http://www.facebook.com/pages/Natick-MA/Vivox-Inc/99504071839?v=app_4949752878, Apr. 27, 2010.
Phonevite, http://phonevite.com/, Apr. 27, 2010.
TwitterFone, http://twitterfone.com/, Apr. 27, 2010.
Tweet Call, http://tweetcall.com, Apr. 27, 2010.
IBM, An Interactive System to Enable and Foster Interactive Participation During Events in Real Time, IPCOM000189472D, Nov. 10, 2009.

* cited by examiner

MEDIA FILES IN VOICE-BASED SOCIAL MEDIA

CROSS REFERENCE TO A RELATED APPLICATION

This application claims priority of U.S. Provisional Application No. 61/354,307, filed Jun. 14, 2010. The subject matter of the earlier filed application is hereby incorporated by reference in its entirety.

FIELD

The present invention relates to inserting information and, more particularly, relates to inserting media into a conversation between two or more devices.

BACKGROUND

Social Networking websites are very popular. Websites such as LinkedIn®, Twitter®, and Facebook® have obtained hundreds of millions of users. As of March 2009, according to Nielsen Online, social networks or blogs account for nearly 10% of all Internet time, and the "Member Communities" category of sites surpassed the email category in Internet popularity, measured by time on site.

Social Media websites have permeated the Internet. It has been said that LinkedIn® is where you work and have worked, Twitter® is what you are currently doing, and Facebook® is who you are. For example, in a Social Media website such as Facebook®, the "Wall" is located on the Profile tab. If someone has communicated with you, it will be located on the wall. When you click on a friend's name, you are first presented with their wall on their Profile page. To write on someone else's wall, go to their page, and write something in the box at the top of the page that says "Write Something". To respond to something written on your wall, click the "Comment" link under their comment and it will be inserted (chronologically) under the entry. Conversations occur this way in the site. Users are able to view conversations (or multiple entries by many different people) by the comments left under the entry left on the wall.

Twitter® is used by millions of people. As of April 2009, this site has grown more than 700%, to more than 10 million users, and growing. Twitter is "a service for friends, family, and co-workers to communicate and stay connected through the exchange of quick, frequent answers to one simple question: What are you doing?" . . . . With messaging systems (like Twitter®), things happen in a different manner. Users send short (140 characters max) messages via a computer or mobile device that are posted to the site. Users "follow" other users and receive their messages. So, any message posted to the site is automatically seen by those users that are following the user that sent the message.

LinkedIn® is the world's largest professional network with over 55 million members and growing rapidly. LinkedIn® connects you to your trusted contacts and helps you exchange knowledge, ideas, and opportunities with a broader network of professionals. LinkedIn® is where a user can get connected to other users, building a trusted network of contacts. A user is able to send private messages that are posted inside the system privately.

Currently, there may be systems for random voice communications through a social network to allow voice connections between users of a social network. The users are granted access to the social network via a Voice over Internet Protocol (VoIP) phone. Such a system may include a communications management system (CMS) configured to manage voice communications through a social network and a connection coordinator configured to connect randomly a first user to a second user in response to a user request.

For example, to establish voice connections between users of a social network, the user is granted access to a social network through a VoIP phone. The user then navigates through the social network based on user input and may directly connect to a second user randomly for voice communications based on an authorization. However, the user may only interact using a VoIP phone.

The CMS and the communications network may implement the social network. Connection rooms are a call bridge enabling any number of users to communicate simultaneously. Users within the connection room may be automatically linked to the connection room based on user profiles, preferences, histories, or other data. A device such as a laptop, VoIP phone, or mobile device can connect to parties outside through the CMS without utilizing the social network implemented in the CMS. Below are some examples.

Party Line™, for example, is a Facebook® application that lets you voice chat with your Facebook® friends. When you add Party Line™ to your Facebook® account, you can create group chats with up to 5 people at one time, or set up a chat with your friends so everyone can get on Party Line™ at the same time and chat together.

However, Party Line™ utilizes the phone numbers stored in Facebook® as the called number when establishing the Party Line™ connections. The Party Line™ application interfaces with Facebook® to originate the conference call (i.e., establish the original call to the conference port), and to obtain the numbers of the parties on the call if they are Facebook® friends.

Vivox Web Voice™, for example, is an application for Facebook® that combines the Vivox™ Network with the social environment of Facebook® to connect friends. Users can have virtual reunions, play games or conduct meetings. Vivox Web Voice™ is designed to provide a simple way to get a group talking.

The Vivox™ application allows communication through the computer's browser on the Facebook® page. For example, there is a button to turn the user's microphone on and off to allow speaking. The connected user can be heard through the user's computer speakers. The Vivox™ application allows for real-time communication utilizing the Facebook® application to initiate the conference parameters and contacts. It should be noted, however, that the Vivox™ application would not allow the user to make a recording and post the recording on a user's wall.

With Phonevite™, for example, a user can send voice messages to their friends via the phone, share recordings via Twitter® ( ), Facebook® ( ), MySpace® ( ), and email or just embed the audio directly to their website. Once the user has made a voice recording (either via a recording browser app or via phone), the recording will appear in their recording inbox. However, the user can only see five small icons at the bottom for each of the key social services. Twitter® will create the ready-to-share tweet once you post a recording to Twitter®.

With TwitterFone™, for example, messages can be sent to Twitter® via the phone. However, TwitterFone™ utilizes voice-to-text algorithms to convert the data.

With TweetCall™, for example, the user can call an 800 number and speak the tweet into the phone. The voice, however, is transcribed and posted to Twitter® as text.

SUMMARY

Certain embodiments of the present invention may provide solutions to the problems and needs in the art that have not yet been fully identified, appreciated, or solved by current social media applications.

In accordance with an embodiment of the present invention, a method is provided for inserting information into a conversation between two or more devices. The method includes receiving speech data at a device, analyzing the speech data and converting the speech data into text utilizing one or more speech-to-text algorithms, and examining the text to locate information related to the text on a data network.

In yet another embodiment of the present invention, a computer program is provided. The computer program is embodied on a non-transitory computer-readable medium. The computer program causes a processor to receive and analyze speech data and to convert the speech data into text utilizing one or more speech-to-text algorithms, and to examine the text to locate information related to the text on a data network.

In yet another embodiment of the present invention, an apparatus is provided including a processor and memory configured to store an application. The processor is configured to receive and analyze speech data and to convert the speech data into text utilizing one or more speech-to-text algorithms, and to examine the text to locate information related to the text on a data network.

BRIEF DESCRIPTION OF THE DRAWINGS

For a proper understanding of the invention, reference should be made to the accompanying figures. These figures depict only some embodiments of the invention and are not limiting of the scope of the invention. Regarding the figures.

DETAILED DESCRIPTION OF THE EMBODIMENTS

Figure 1:
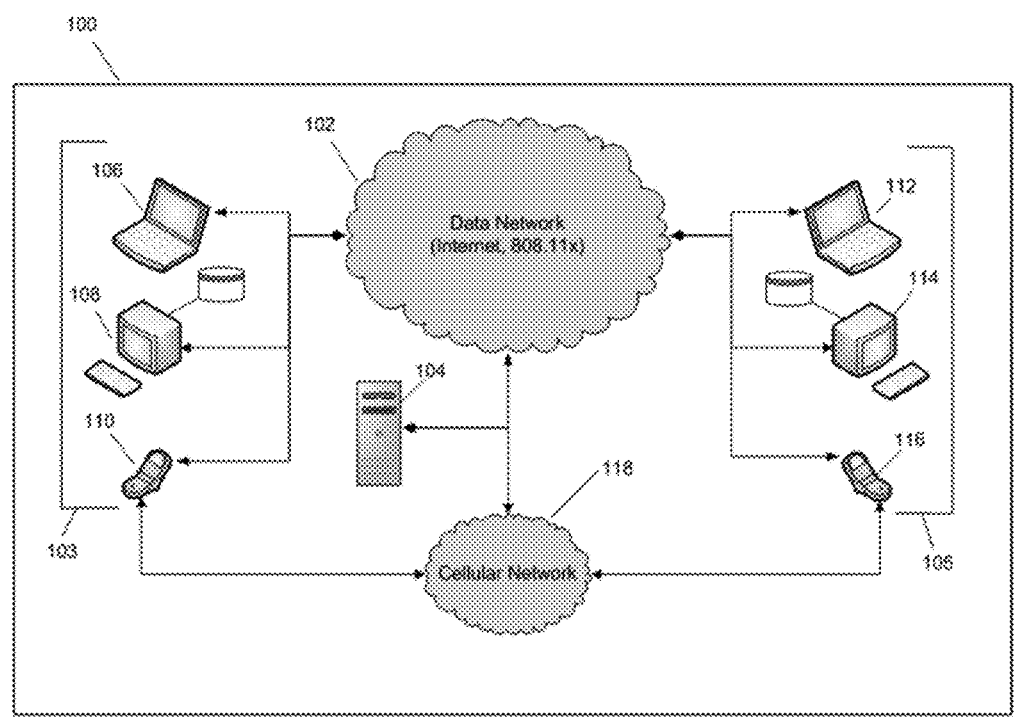
FIG. 1 illustrates a network architecture, in accordance with an embodiment of the present invention.

It will be readily understood that the components of the invention, as generally described and illustrated in the figures herein, may be arranged and designed in a wide variety of different configurations. Thus, the following detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

The embodiments described herein build upon the functionality that enables users to utilize a mobile device to initiate and carry on a conversation with members in a social network without using a voice channel. The embodiments described herein also further the functionality inherent to a user inserting various kinds of information to the conversation. The embodiments detail the functionality of the insertion of the information on both a mobile device, as well as a computer system. The embodiments also discuss allowing the user to submit a command via speech, text, or other input into the conversation, where the instant application will perform the specific actions. The commands can be prefaced by a user-defined or a system/application defined "intro-command" followed by the command entered by the user. These commands are not relayed to, heard by, or otherwise received by the other parties in the conversation, and cause the application to perform the entered command such as uploading an information file into the conversation. Information that can be inserted in the conversation includes, but is not limited to: audio files, video files, document files, multimedia files, image files, and any other file that can be appreciated by a person of ordinary skill in the art.

The embodiments described herein include an apparatus, a method, and a computer program to attach the information to a conversation on a mobile device, a computer system, or any device appreciated by a person of ordinary skill in the art. The information can be presented on the user's device, or a URL link can be inserted for information located on the Internet. The embodiments describe how the information, once inserted into the conversation, is viewed by users in the conversation, or by users viewing a conversation that has previously taken place.

FIG. 1 illustrates a network architecture 100 in accordance with an embodiment of the present invention. The network architecture 100 includes, but is not limited to, a data network (or Internet) 102, multiple client machines (or client devices) 103, a server 104, multiple remote machines (or remote devices) 105, and a cellular network 118. The client machines 103 include a mobile laptop device 106, a personal desktop computer 108, and a wireless device 110, but may include any other suitable device that would be appreciated by a person of ordinary skill in the art. The remote machines 105 include a mobile laptop device 112, a personal desktop computer 114, and a wireless device 116, but may include any other suitable device that would be appreciated by a person of ordinary skill in the art. The client machines 103 and the remote machines 105 are operably connected to the Internet 102 and the cellular (or wireless) network 118.

The network architecture 100 shown in FIG. 1 allows a user utilizing one or more client machines 103 to access an application (or software) to be downloaded from the server 104 or that currently resides on the client machines 103. It should be appreciated that the application can not only reside on the server 104 but can also reside completely, or in a distributed manner, on one or more of the devices or networks shown in FIG. 1. The user of the application can access any of the client machines 103 and connect to one or more of the remote machines 105. If the client is on the wireless device 110 or 116, the server 104 can be accessed via the data network 102, or the cellular network (e.g., a mobile network) 118. It should be appreciated that other types of devices, in addition to a mobile device, can also transmit and receive information.

The application can also be accessed via the client machines 103, or remote machines 105, and connected by a cellular network 118. Notifications can be sent from the server 104 to the client machines 103 via the data network 102, or through the cellular network 118. It should be appreciated that other devices normally utilized for accessing the data network 102 can also utilize the application. Such devices may include a PDA, an MP3 player, or a gaming device (i.e., a hand held system or a home based system).

Figure 2:
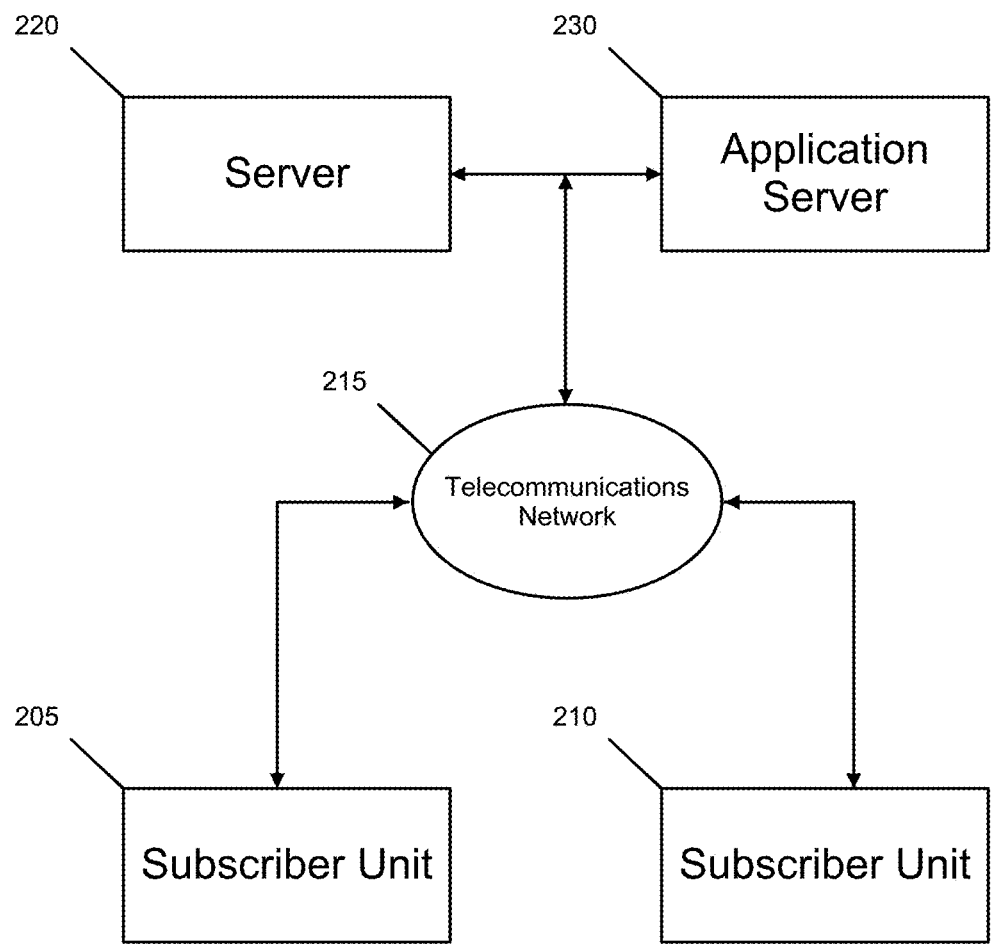
FIG. 2 illustrates a system configured to dispatch an information packet based on voice browsing, in accordance with one or more embodiments of the present invention.

FIG. 2 illustrates a system 200 configured to dispatch an information packet based on voice browsing in accordance with one or more embodiments of the present invention. Generally, a mobile device has many shortcomings if utilized in a normal manner. For example, to make a call, the user must dial digits, the call must be routed through the mobile system, and voice and data channels must be allocated through the mobile network. Also, associated with the normal use of mobile devices is the time of dial-up delay, as well as the considerable time between the commencement of dialing and the completion of the connection.

However, with the utilization of voice browsing technology in a telecommunications network, the user can receive audio output of the conversation and input audio to add to the conversation via a mobile device. As a result, dialing is not needed, because regular voice channels do not need to be utilized.

For example, a subscriber unit 205 is configured to transmit an origination packet that includes a voice frame (or speech data). The origination packet is routed to a system server 220 via the telecommunication network 215 utilizing a wireless non-circuit-switched service thereof. Within the system server 220, the origination packet is converted into an extensible markup language (XML) query. The XML query is transmitted from the system server 220 to an application server 230. Within the application server 230, an XML reply is fetched in response to the XML query. The XML reply is received from the application server 230 at the system server 220. The XML reply is converted into a destination packet within the system server 220. The destination packet is routed to the subscriber unit 205 and/or another subscriber unit 210 via the telecommunication network utilizing the wireless non-circuit-switched service thereof. The destination packet is received at the subscriber unit 205 and/or the other subscriber unit 210.

Figure 3:
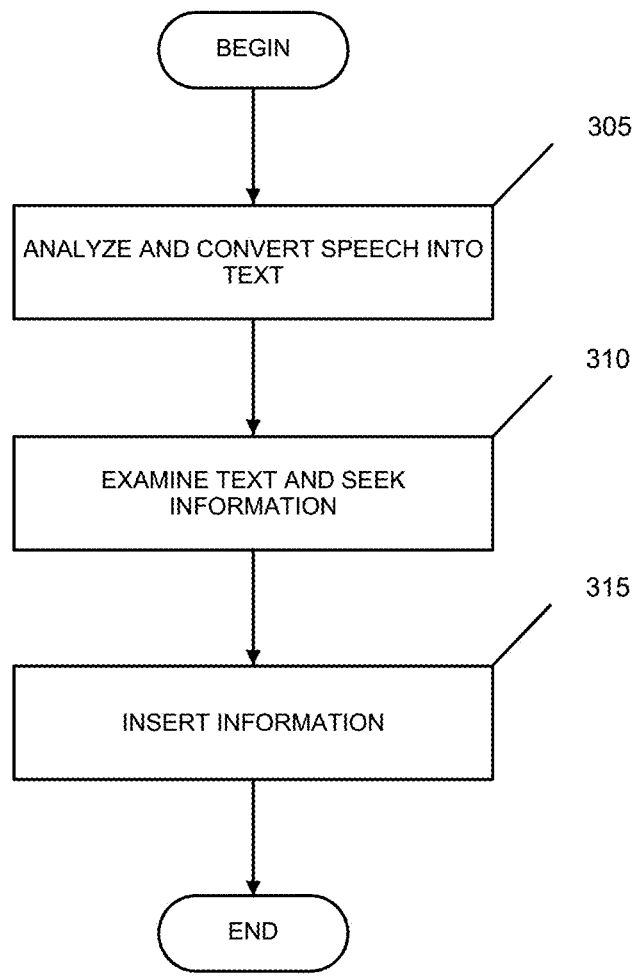
FIG. 3 illustrates a method for automatically inserting information into the conversation, in accordance with one or more embodiments of the present invention.

FIG. 3 illustrates a method 300 for automatically inserting information into the conversation in accordance with one or more embodiments of the present invention. For example, when the user utilizes an electronic device, (such as a smart phone, tablet, computer system, etc.), the information is presented on the user's device where the information can automatically be displayed, heard, etc., or where the user would have to take action depending on the application's configuration.

The application stores information of all of the parties involved in the conversation. This information can include the user's name, destination mobile server node, information that the user is utilizing, as well as any other information that would be appreciated by a person of ordinary skill in the art. The application also utilizes the user's destination server node to send messages (packetized voice messages, URLs containing information or information files that are inserted into the user's device) to the other parties in the conversation.

Utilizing one or more speech-to-text algorithms, the speech in the conversation is analyzed and converted to text at 305. At 310, the text is examined and the application seeks the information using application programming interfaces (APIs) currently available as interfaces for information located on the Internet. At 315, links or information files are inserted into the conversation for all users involved in the current conversation.

Current technology available in the market allows speech to be converted to text. For example, Dragon's Naturally Speaking® is one such consumer product that is currently available. The application also includes a software development kit (SDK) available to allow developers to add cutting-edge speech recognition technology to any Windows-based application. The development kit includes tools, libraries, and ActiveX components. Utilizing these components, the application facilitates speech recognition, allowing the speech in the conversation to be converted into text that is then parsed and stored in the application.

In developing the speech-to-text integration, there are two methods that are utilized for interactions with the speech conversion engine: front-end speech recognition and back-end speech recognition. Front-end speech recognition takes place in real-time at the location where the user is dictating. On the other hand, back-end speech recognition takes place on a remote machine in a network. Because this is not real-time recognition, the results are produced in batch mode. In other words, the conversion program is installed into the user's mobile device (if supported) to allow the real-time conversion and parsing of the user's conversation on the mobile device.

Figure 4:
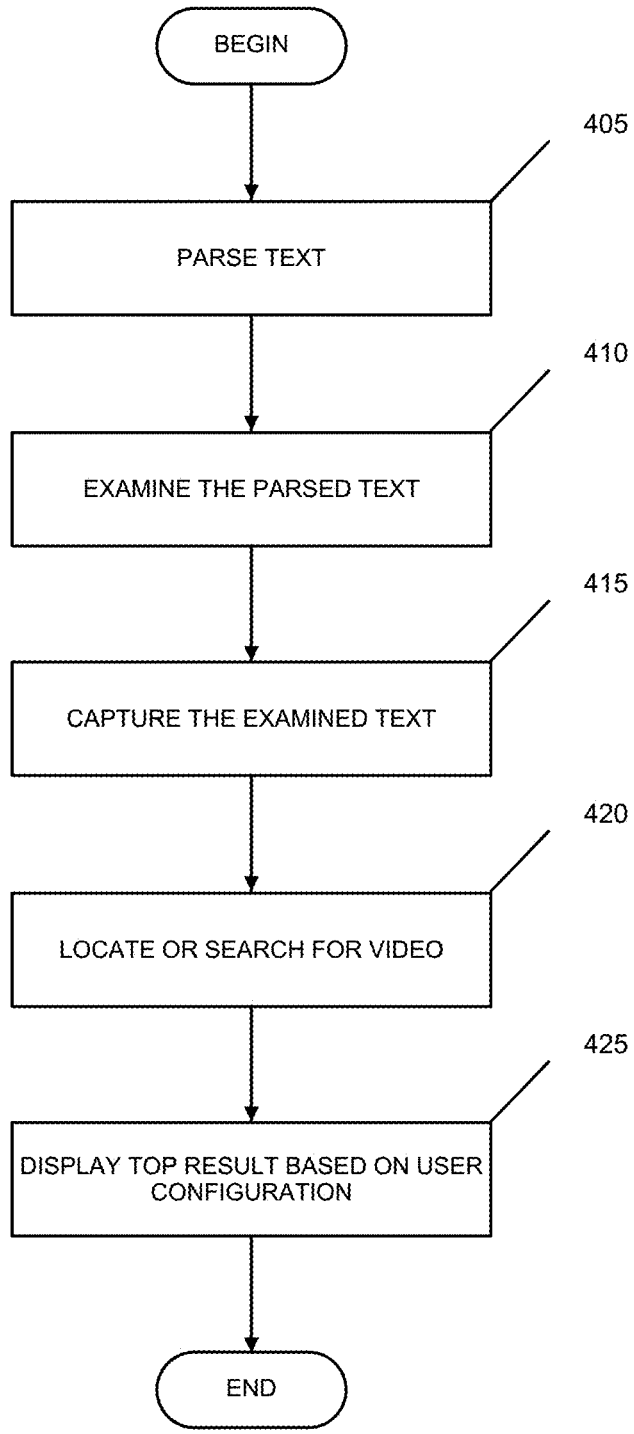
FIG. 4 illustrates another method for parsing and examining converted text, in accordance with one or more embodiments of the present invention.

FIG. 4 illustrates a method 400 for parsing and examining converted text in accordance with one or more embodiments of the present invention. For example, if a user in the conversation says: "Did you see that video where the wind scores an own goal?" The application automatically converts all of the speech in the conversation to text using speech-to-text functionality. Once the speech is converted, the application parses the text at 405 and, at 410, the application examines any text that may be related. For example, any mention of "Video" is examined to see whether an associated video is located utilizing the description mentioned in the conversation. In the above example, the text "Video wind scores own goal" is captured at 415, and the application attempts to locate or search at 420 for a video on both the user's current device, and/or on the Internet with the title "wind scores own goal."

It should be appreciated that the text can be stored in the application for a user-configurable amount of time. The configuration section of the application also allows the user to specify the amount of text that is stored by allowing the user to determine how many previously recorded conversations are stored, or how many days/weeks/months of conversations are stored.

When attempting to locate a video on the Internet, one example of a search for the video on a website, such as YouTube®, Hulu®, etc. is as follows: http://www.youtube- .com/watch?v=tYJttBJq6lw&feature=topvideos. The YouTube® API allows external applications to query content on the web site. The Data API allows a program to perform many of the operations available on the YouTube® website including searching for content.

To search for videos, an HTTP GET request can be utilized, appending the query parameters to the request: http://gdata.youtube.com/feeds/api/videos. For example, a request to the following URL searches for the second set of 10 recently uploaded videos matching the query term "wind scores an own goal".

```
http://gdata.youtube.com/feeds/api/videos?
    q=wind+scores+an+own+goal
    &orderby=published
    &start-index=11
    &max-results=10
```

At 425, the top result from the HTTP GET results is returned to the application, where the user can click to play the video directly in the application, or the video is automatically inserted and begins to play according to the user's configuration of the application.

Once a video is located, the way that the information is presented to each of the users in the conversation is configurable by the users of the application. The options in the configuration include, but are not limited to:

Make the information displayable to me, and allow me to push to other parties, or Information is presented automatically to users in the conversation.

Assuming that the user configured information is to be presented to users in the conversation, shortly after the user said "Did you see that video where the wind scores an own goal?", the information will be presented to all of the users on the conversation, allowing each user to play the video while on the conversation, or the video is automatically inserted and begins to play according to that user's configuration of the application.

Figure 5:
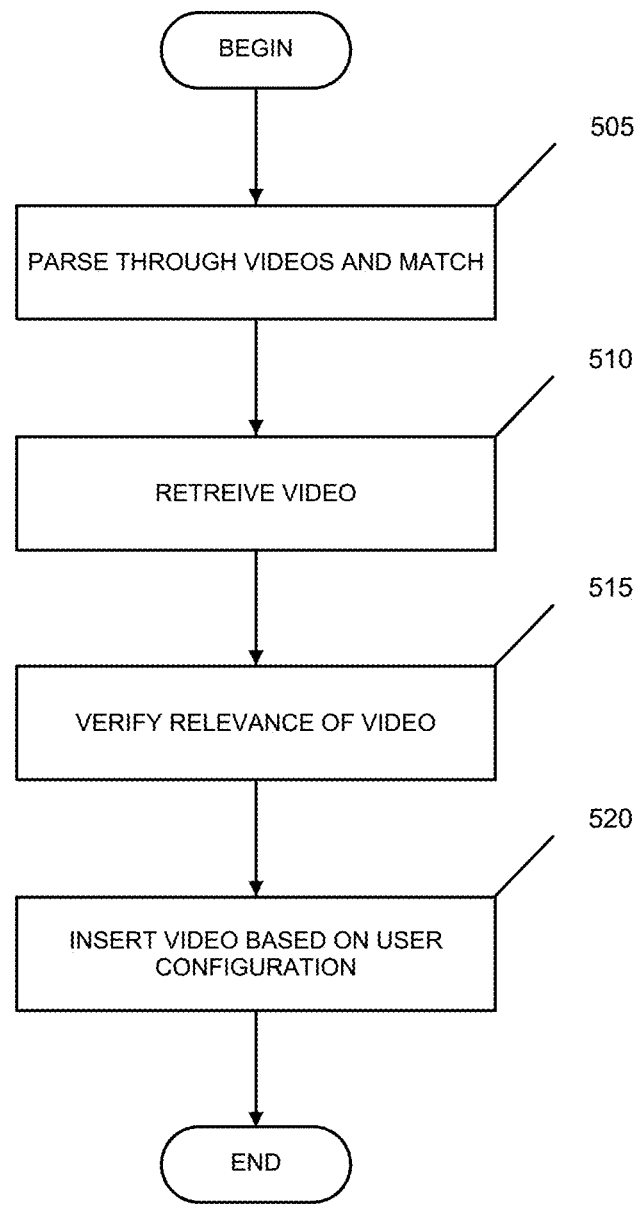
FIG. 5 illustrates a method for parsing through videos, in accordance with one or more embodiments of the present invention.

FIG. 5 illustrates a method 500 to parse through videos in accordance with one or more embodiments of the present invention. When parsing through the videos, the application matches at 505 those videos that are most popular and/or most recent. When querying videos, the APIs of online media sites (e.g., YouTube®) allow certain parameters to query specifically ranked videos. The following table lists some standard feeds that are typically available when querying videos:

| | |
|---|---|
| Most Viewed | Most Discussed |
| Top Rated | Top Favorites |
| Recently Featured | Most Responded |
| Watch On Mobile | Most Recent |

Utilizing the standard feeds, the information is retrieved at 510, which falls under most recent, top favorites, most viewed, etc. This can allow a user to return the most relevant information in the query.

It should also be appreciated that custom parameters are also available in the API in some embodiments. The custom parameters allow retrieved media to be sorted by utilizing the "ordered by" field. This field allows the media to be sorted according to the following rules:

In a request for a video feed, the following values are valid for this parameter:

relevance—Entries are ordered by their relevance to a search query. This is the default setting for video search results feeds.

published—Entries are returned in reverse chronological order. This is the default value for video feeds other than search results feeds.

viewCount—Entries are ordered from most views to least views.

rating—Entries are ordered from highest rating to lowest rating.

When searching for videos, the user can also request results that are most relevant to a specific language by setting the parameter value relevance_lang_languageCode, where languageCode is an ISO 639-1 two-letter language code. (Use the values zh-Hans for simplified Chinese and zh-Hant for traditional Chinese.) Please note that results in other languages will still be returned if they are highly relevant to the search query term.

Utilizing the standard feeds and the custom parameters, the media or video returned by the query is verified at 515 to be of certain relevance. At 520, the media or video can be automatically inserted into the conversation if the user has that option configured.

Meta tags are also utilized to obtain relevance when searching media from Internet sites. Meta tags are similar to meta tags for web pages, except each tag is prefaced with "video:". In the video world, three meta tags are prevalent. The video: title tag, the video:description tag, and the video tag, which is a keyword tag for keywords and short keyword phrases. These meta tags are queried and used to obtain specific information that matches your query in a meaningful manner.

In another embodiment of the present invention, the configuration of the application allows a setting to allow the information to begin automatically playing on the user's device. When this option is enabled, the information inserted into the conversation will automatically begin playing for the user to view.

When using the algorithms to obtain the information from the Internet, if the application determines that the information obtained is not relevant, it will post the most relevant information that it returned to the user and allow the user to validate the information before automatically inserting it into the conversation. This option is only applicable if the user has chosen to automatically insert the information into the conversation via the configuration portion of the application. The relevance of the information is determined by the date of the information compared with the current date, or the similarity of the information compared to the query specifications when the query was made.

Figure 6:
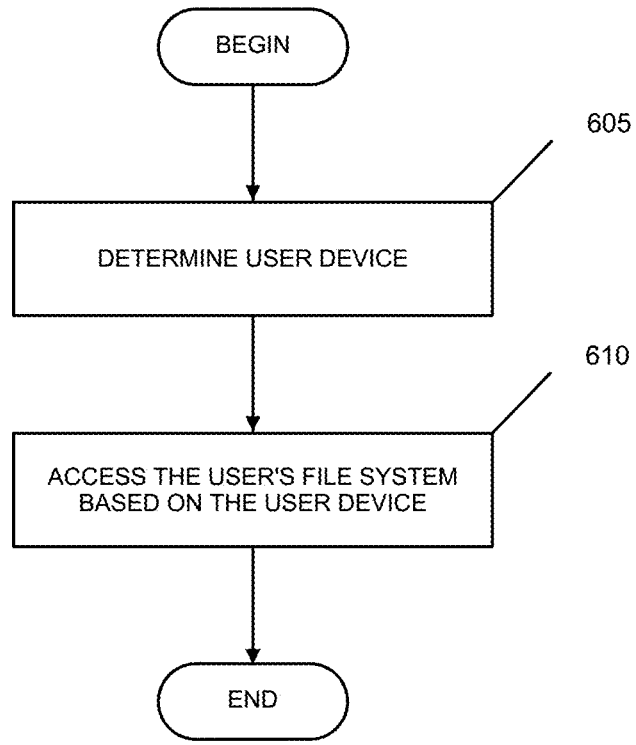
FIG. 6 illustrates a method for obtaining access to a user's file system, in accordance with one or more embodiments of the present invention.

FIG. 6 illustrates a method 600 for obtaining access to the user's file system in accordance with one or more embodiments of the present invention. In this embodiment, applications have access to the user's file system either on the user's mobile device, or the user's computer system or mobile device by utilization file access classes. At 605, the application determines the type of device being used by the user. At 610, the application accesses the user's file system based on the device being used.

For example, in the desktop environment, one particular programming environment (e.g., Adobe Flex®) has components that allow an application to browse files and upload them into the application. The Tree, DataGrid, ComboBox, and others include pre-built awareness of the user's file system on the user's computer. These controls duplicate functionality of commonly used interface controls, which is common in desktop applications. These controls allow the application to browse through directories in the file system and select files to perform an action.

The Adobe Air® development environment, for example, includes a rich set of file APIs that enable developers to:
Read from and write to the file system,
Move, copy, and delete files,
Traverse directories; open native file picker dialog boxes,
Open files with their default registered application,
Flag files as "downloaded" so that some operating systems will caution users before opening them for the first time, and
Get notified of mounted and unmounted storage volumes, and query those volumes for information.

For example, in the mobile phone programming environment, the user's mobile device's file system can be access by various programs according to the specific mobile device:
Java 2 Platform, Micro edition Mobile Device Information Profile (MIDP) utilizing the Java Specification Request (JSR)75 allows file access to the device's file system when working with the Wireless Toolkit (WTK).
In the .NET development world, a developer can utilize the file system on the mobile device by the remote API (Rapi), which is installed along with ActiveSync/Windows Mobile Device Center.
The Android development environment, for example, includes classes allowing an application to have access to the mobile device's file system. The MediaStore class, for example, provides metadata for all available media on the mobile device's internal and external storage. Some methods commonly used in the Android environment to access the mobile device's file system include:
getContentUrl( )—get the content URI for the image media table on a given volume of the user's device,
out.write( )—write a string to the current Output Stream, and
file.createNewFile( )—creates a new file that is written in the user's mobile device.

The method steps performed in FIGS. 3 to 6 may be performed, in part, by a computer program product, encoding instructions for a nonlinear adaptive processor to cause at least the methods described in FIGS. 3 to 6 to be performed by the apparatuses discussed herein. The computer program product may be embodied on a non-transitory computer readable medium. The computer readable medium may be, but is not limited to, a hard disk drive, a flash device, a random access memory, a tape, or any other such medium used to store data. The computer program product may include encoded instructions for controlling the nonlinear adaptive processor to implement the method described in FIGS. 3 to 6, which may also be stored on the computer readable medium.

The computer program product can be implemented in hardware, software, or a hybrid implementation. The computer program product can be composed of modules that are in operative communication with one another, and which are designed to pass information or instructions to display. The computer program product can be configured to operate on a general purpose computer, or an application specific integrated circuit ("ASIC").

Figure 7:
FIG. 7 illustrates a video linked in a conversation as viewed on a user's mobile device, in accordance with one or more embodiments of the present invention.

FIG. 7 illustrates a video 700 linked to a conversation on a user's mobile device in accordance with one or more embodiments of the present invention. In this embodiment, the interaction of information and a conversation allows intuitive functionality not previously seen in applications. While on a conversation, a user is able to insert information into the conversation. This information is either displayed to the user that uploaded the information first, or is displayed to all users on the conversation according to the user's configuration. In addition to displaying the video to the users on the conversation, the video is stored on the application's website and is viewable when a user views stored conversations that either are in progress, or have completed.

Figure 8:
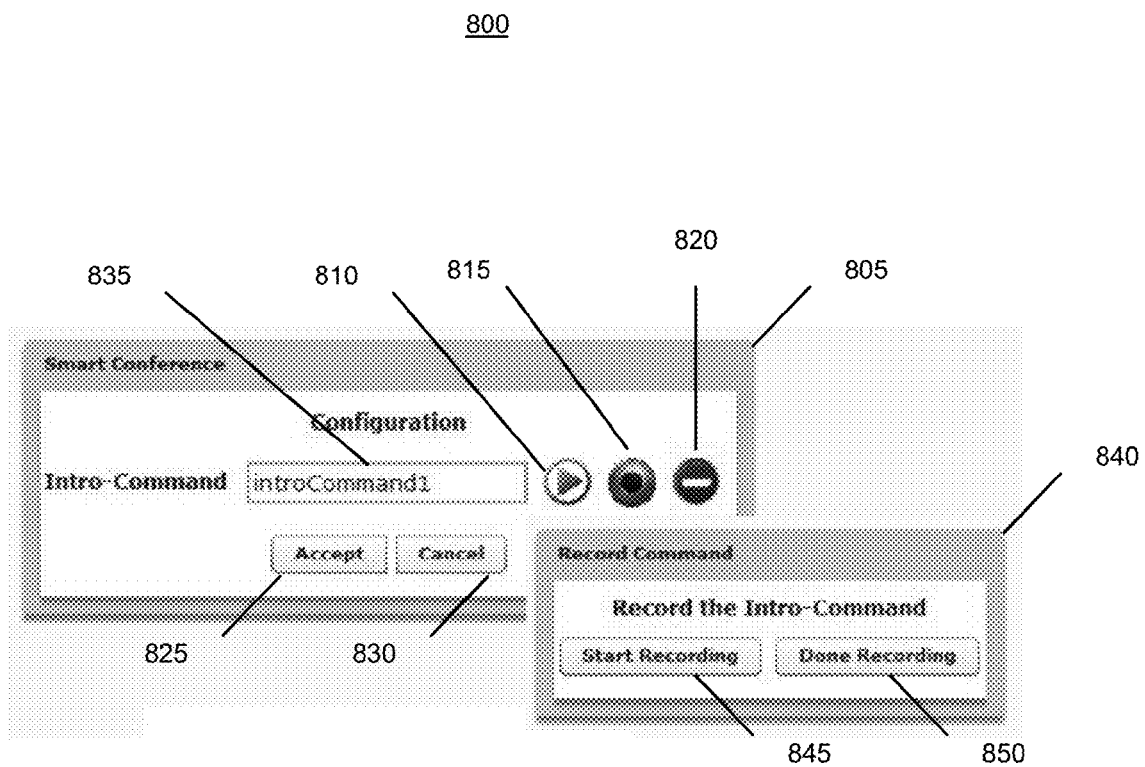
FIG. 8 illustrates a record intro-command graphical user interface window, in accordance with one or more embodiments of the present invention.

FIG. 8 illustrates record intro-command GUI Window 800 in accordance with one or more embodiments of the present invention. The utilization of voice browsing technology allows various functions that were not previously used in communication applications. The parts of the user's conversation are analyzed prior to relaying the conversation piece to the other users in the conversation. This functionality allows certain techniques to be performed that are outside normal conversation applications.

In this embodiment, the application allows users to enter commands into the conversation, which may not be relayed to other users in the conversation. The application accepts the command, and acts on the command without the other parties in the conversation knowing. For example, when the user directs the application to upload an information file from the file system by speaking a command into the conversation, the information file is inserted into the conversation. As a result, the information file is displayed on the user's phone if the user in the conversation is on a mobile device, or on the user's computer if the user is on the conversation on a computer.

To allow this functionality to interwork with an ongoing conversation, a user should speak an "intro-command" preceding the actual command. This intro-command is configurable by the user in the application's configuration section. In the configuration window, the user will be able to train the application to accept a voice prompt that will precede the command that the user wishes the application to perform.

For example, FIG. 8 illustrates a portion of the application's configuration screen. The user enters a voice command by pressing "Record" 815. The current intro-command can also be deleted by pressing "Delete" 820. When "Record" 815 is pressed, the user is presented with a Record Command dialogue window 840 where the user records the command. The user can then press "Start Recording" 845 and speak the command into the application. After the command has been spoken, the user then presses "Done Recording" 850. At that point, the Record Command Dialogue window 840 is removed, and the user can play back the command by pressing "Play" 810. Once the command has been accepted, the user then enters a label 835 for the command, and the command is henceforth utilized by the application to enable the user to enter commands by voice only. The user can also press "Delete" 820 to remove the current intro-command, press "Accept" 825 to close out the configuration window, press "Record" 815 again to re-record the command, or press "Cancel" 830 to cancel the application configuration screen. In another embodiment of the present invention, the user is able to type the intro-command into the device that will indicate to the application that the command will be input via text by the user.

In this embodiment, let us assume that a user has configured an intro-command where the user speaks the letters "C M D". While involved in a conversation, the user says: "CMD, that was a great Jimmy Buffet concert that I went to last night." The application determines that this is a voice command when the speech-to-text conversation is made. The application does not treat this speech as normal conversation speech, but processes it as a command. The speech is not transmitted to the other parties in the conversation, and the speech portion is not stored on the application's website.

With respect to this example, when the command is spoken into the application, it automatically begins to upload information files related to the concert. The information files may be images, video files, etc. from the file system of the user's device. When the upload is complete, the information will either be presented to the user only, or to all parties involved in the conversation according to the configuration of the application. The information can be stored on the application's website to be accessed by all of the users on the conversation if they have access to the website.

In another embodiment of the present invention, the command phrase can be placed after the user has spoken a command. In this instance, a pause (which is user definable in the application's configuration) is made after the command phrase. This indicates that the previous speech sentence is the command. For example: "The Jimmy Buffet concert was awesome, CMD."

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method for inserting information into a conversation between two or more devices, comprising:
   receiving speech data at one of the two or more devices;
   analyzing the speech data and converting the speech data into text utilizing one or more speech-to-text algorithms;
   parsing the text;
   determining whether a voice command has been relayed based on the parsed text;
   directing an action based on the relayed voice command;
   examining the parsed text based on the relayed voice command to locate information related to the text on a social media website;
   verifying relevance of the related information based on a date of the related information relative to a current date and a similarity of the related information compared to the directed action;
   retrieving the verified related information sorted according to user rules, wherein the user rules comprise chronological order, viewership, rating, and the relevance;
   inserting the verified retrieved related information to the two or more devices; and
   viewing the verified retrieved related information from a previous conversation.

2. The method of claim 1,
   wherein the verified retrieved related information is automatically displayed or played in an audio message based on a configuration of an application.

3. The method of claim 1, further comprising:
   storing the parsed text.

4. The method of claim 3, further comprising:
   capturing the related information and locating the related information on an associated video stored in the one or more devices and the social media website.

5. The method of claim 4, further comprising:
   when parsing through the information or associated videos, matching the information or associated videos based on a defined category, the defined category comprising one of the following: most viewed, most discussed, top rated, top favorite, recently featured, most responded, most recent, most relevant language, and watch on mobile;
   verifying relevance of matched information or the associated videos; and
   inserting the relevant information or the associated video on one or more devices based on a configuration of an application.

6. The method of claim 4, further comprising:
   determining whether the device is a mobile phone or a computer system; and
   accessing a file system of the device based on whether the device is the mobile phone or the computer system.

7. The method of claim 1, further comprising:
   determining whether a voice command is made during speech to text conversion; and
   automatically inserting information related to the voice command on one or more devices when the voice command is made.

8. A computer program embodied on a non-transitory computer-readable medium, the computer program causing a processor to:
   receive and analyze speech data and convert the speech data into text utilizing one or more speech-to-text algorithms;
   parse the text;
   determine whether a voice command has been relayed based on the parsed text;
   direct an action based on the relayed voice command;
   examine the parsed text based on the relayed voice command to locate information related to the text on a social media website;
   verify relevance of the related information based on the related information relative to a current date and a similarity of the related information compared to the directed action;
   retrieve the verified related information sorted according to user rules, wherein the user rules comprise chronological order, viewership, rating, and the relevance;
   insert the verified retrieved related information to two or more devices; and
   view the verified retrieved related information from a previous conversation.

9. The computer program of claim 8,
   wherein the verified retrieved related information is automatically displayed or played in an audio message based on a configuration of an application.

10. The computer program of claim 8, wherein the computer program further causes the processor to:
    store the parsed text.

11. The computer program of claim 10, the program further causing the processor to:
    capture the related text and locate the related information on an associated video stored in one or more device and the social media website.

12. The computer program of claim 11, the program further causing the processor to:
    when parsing through the information or associated videos, match the information or associated videos based on a defined category, the defined category comprising one or more of the following: most viewed, most discussed, top rated, top favorite, recently featured, most responded, most recent, most relevant language, and watch on mobile;
verify relevance of matched information or the associated videos; and
insert the relevant information or the associated video on one or more devices based on a configuration of an application.

13. The computer program of claim 11, the program further causing the processor to:
determine whether the device is a mobile phone or a computer system; and
access a file system of the device based on whether the device is the mobile phone or the computer system.

14. An apparatus, comprising:
a processor; and
memory storing an application,
wherein the processor is configured to:
receive and analyze speech data and convert the speech data into text utilizing one or more speech-to-text algorithms;
parse the text;
determine whether a voice command has been relayed based on the parsed text;
direct an action based on the relayed voice command;
examine the parsed text based on the relayed voice command to locate information related to the text on a social media website;
verify relevance of the related information based on a date of the related information relative to a current date and a similarity of the related information compared to the directed action;
retrieve the verified related information sorted according to user rules, wherein the user rules comprise chronological order, viewership, rating, and the relevance;
insert the verified retrieved related information to two or more devices; and
view the verified retrieved related information from a previous conversation.

15. The apparatus of claim 14,
wherein the verified retrieved related information is automatically displayed or played in an audio message based on a configuration of the application.

16. The apparatus of claim 14, wherein the processor is further configured to:
store the parsed text.

17. The apparatus of claim 16, wherein the processor is further configured to:
capture the related text and locate the related information on an associated video stored in the one or more apparatus and the social media website.

18. The apparatus of claim 17, wherein the processor is further configured to:
when parsing through the information or associated videos, match the information or associated videos based on a defined category, the defined category comprising one or more of the following: most viewed, most discussed, top rated, top favorite, recently featured, most responded, most recent, most relevant language, and watch on mobile;
verify relevance of matched information or the associated videos; and
insert the relevant information or the associated video on one or more apparatus based on a configuration of the application.

19. The apparatus of claim 17, wherein the processor is further configured to:
determine whether the apparatus is a mobile phone or a computer system; and
access a file system of the apparatus based on whether the apparatus is the mobile phone or the computer system.

20. The apparatus of claim 14, wherein the processor is further configured to:
determine whether a voice command is made during speech to text conversion; and
automatically insert information related to the voice command on one or more apparatus when the voice command is made.

* * * * *